(No Model.)
R. S. HOWLAND.
SECONDARY ELECTRIC CLOCK.
No. 499,737. Patented June 20, 1893.
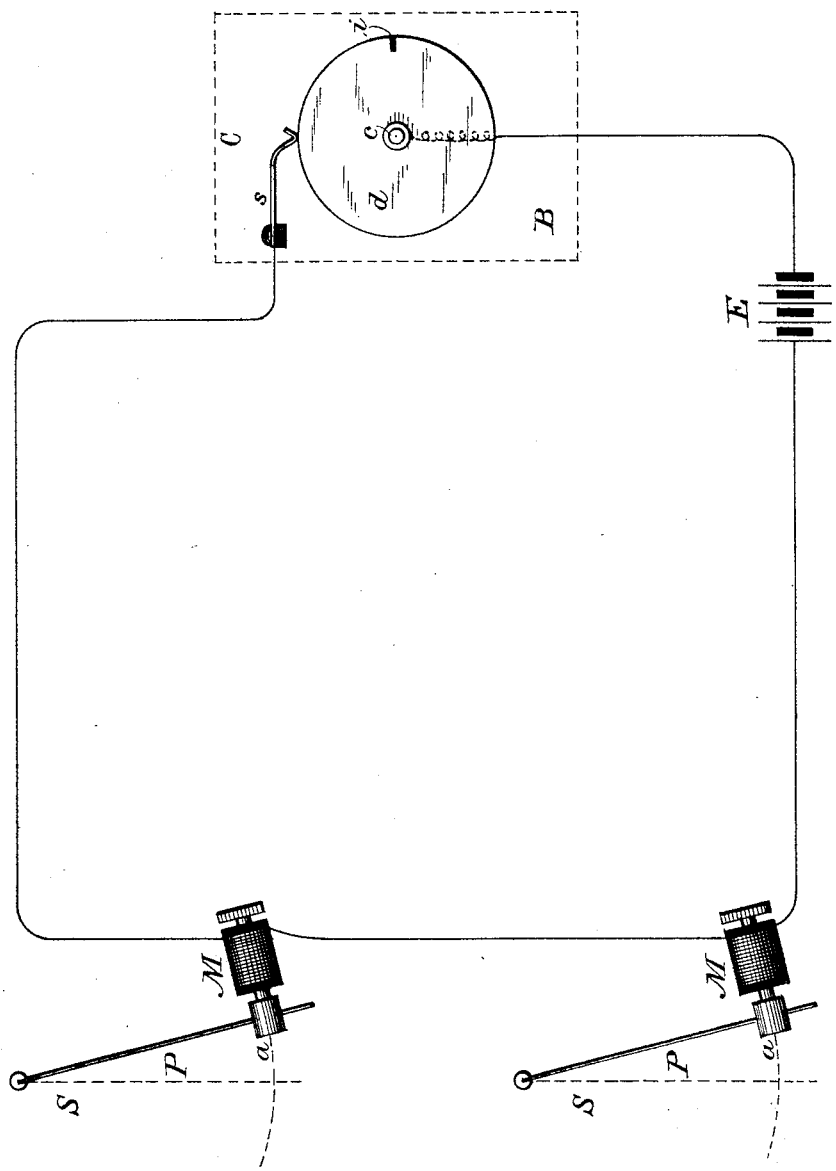
Witnesses
Inventor
Richard S. Howland
by J. H. Soulé
his Attorney

UNITED STATES PATENT OFFICE.

RICHARD S. HOWLAND, OF PROVIDENCE, RHODE ISLAND.

SECONDARY ELECTRIC CLOCK.

SPECIFICATION forming part of Letters Patent No. 499,737, dated June 20, 1893.

Application filed January 4, 1893. Serial No. 457,215. (No model.)

*To all whom it may concern:*

Be it known that I, RICHARD S. HOWLAND, of Providence, in the county of Providence and State of Rhode Island, have invented certain new and useful Improvements in Secondary Electric Clocks, of which the following is a specification.

The present improvements are illustrated in the accompanying drawing which is a diagrammatic view of the same.

Each secondary clock S (of which two are shown) comprises as its motive power a swinging pendulum P, weighted at its lower end by an electro-attractive mass $a$ (preferably a cube) of soft iron. An electro-magnet M is fixed at one side of the center of oscillation of the pendulum, and within attractive distance of the mass $a$ of the pendulum when said pendulum approaches the magnet while executing its normal vibration. The weight $a$ of the pendulum thus serves as an armature for the magnet M. All of the magnets M of the secondary clocks in the series are connected in series with a source E of electrical energy and with a primary or master clock C.

The master clock may be of any suitable kind, provided it has a proper circuit-controller B. The circuit-controller B, is the only part of the master-clock whose construction is shown. This circuit controller B, consists in a rotary disk $d$, driven by the master clock so as to rotate once in a given unit of time, say one minute. The circuit-controller is of metal and through its metallic arbor $c$ it is in constant electrical communication with one pole of the electric generator E. Bearing upon the periphery of this disk $d$ is a contact spring $s$ which is in constant electric communication with the opposite pole of the electric generator. Normally the circuit is a closed one, so that the several armatures $a$ of the pendulums of the several secondary clocks are normally held in contact with the electro-magnets M respectively, the strength of the magnets and of the electric generator being sufficient for this purpose. Once, however, during each rotation of the disk $d$, the circuit is broken owing to the presence of a break in the continuity of the metallic periphery of the disk, which break may be caused by a notch in the disk or by an inserted insulating block $i$ of hard rubber. In any case, however, whatever the character or construction of the circuit-controller may be, the break in the circuit should be less in duration than the period of time required for the complete swing or vibration of each pendulum. That is, in the construction shown (assuming that each pendulum requires one second for a complete vibration, and that the disk $d$ of the circuit-controller accomplishes a complete rotation in one minute) the insulating block $i$ at the periphery of the disk $d$ should occupy an arc of less than six degrees, preferably much less and only sufficient to permit a break of sufficient duration to enable the acquired momentum of the pendulum receding from the magnet M, to exceed the attractive power of the magnet.

Each pendulum communicates its movement to the hands of its secondary clock by any suitable clock mechanism, such mechanisms being so well known as to require no specific description.

At the completion of each revolution of the disk $d$ of the primary clock, that is at the end of each selected unit of time (say a minute), the circuit is broken for a fraction of a second and the normally upheld pendulum of each secondary clock is released. The pendulum then swings down and its weight constitutes the motive power for driving the secondary clock, and during its vibration the hands of the secondary clock are moved forward a unit of space corresponding with the selected unit of time. Before (long before, preferably) the pendulum completes its vibration, the continuity of the electric circuit has been restored, so that when the armature weight $a$ of the pendulum approaches the electro-magnet again it is drawn into contact therewith and is there maintained until the circuit is again broken at the end of the next unit of time. In this manner the synchronous movement of the primary and secondary clocks is insured. The driving of each secondary clock is effected not by any power applied by reason of the action of a mechanical force into which the electrical energy is translated, but by the weight of the pendulum.

No nice adjustment of the pendulum is required, and it is not necessary that the pendulum should vibrate in any specified length of time. It is only necessary that the vibration of the pendulum should bear a relation (already stated) to the duration of the break in the circuit, and this relation may be a variable one so long as the duration of the vibration of the pendulum is less than that of the break.

I claim as my invention—

1. A secondary clock, comprising as its motive power a pendulum having an electro-attractive mass or armature, and an electro-magnet at one side of the center of oscillation of the pendulum and within attractive distance of said armature when the pendulum approaches said magnet in its vibration, in combination with a normally closed electric circuit including a source of electric energy and said electro-magnet, and a primary or master clock having a circuit-controller which breaks the said circuit at the completion of each unit of time but which again closes the circuit before the pendulum completes its vibration, substantially as set forth.

2. A secondary clock comprising as its motive power a pendulum having an electro-attractive mass or armature, and an electro-magnet at one side of the center of oscillation of the pendulum and within attractive distance of said armature when the pendulum approaches said magnet in its vibration, in combination with a normally closed electric circuit including a source of electric energy and said electro-magnet, and a primary or master clock having a circuit-controller which normally closes said electric circuit whereby said pendulum is normally held by the electro-magnet, but which breaks the said circuit at the completion of each unit of time thereby permitting the release and vibration of said pendulum, and then again closes said circuit whereby said pendulum is again held by said magnet, substantially as set forth.

In testimony whereof I affix my signature in presence of two witnesses.

RICHARD S. HOWLAND.

Witnesses:
JAMES B. GAY,
HENRY R. DAVIS.